US011338935B1

(12) United States Patent
Lo et al.

(10) Patent No.: US 11,338,935 B1
(45) Date of Patent: May 24, 2022

(54) AUTOMATED FLIGHT CONTROL FUNCTIONAL TESTING

(71) Applicant: Textron Aviation Inc., Wichita, KS (US)

(72) Inventors: Jodi Jo Yee Lo, Wichita, KS (US); Nicolas Lucas Gallo, Tuxtla Gutierrez (MX); Johnny Ross Moore, Goddard, KS (US)

(73) Assignee: Textron Innovations, Inc., Providence, RI (US)

( * ) Notice: Subject to any disclaimer, the term of this patent is extended or adjusted under 35 U.S.C. 154(b) by 267 days.

(21) Appl. No.: 16/565,716

(22) Filed: Sep. 10, 2019

Related U.S. Application Data

(60) Provisional application No. 62/729,007, filed on Sep. 10, 2018.

(51) Int. Cl.
| | |
|---|---|
| *B64D 45/00* | (2006.01) |
| *B64F 5/60* | (2017.01) |
| *G05D 1/06* | (2006.01) |
| *G05D 1/00* | (2006.01) |

(52) U.S. Cl.
CPC ............ *B64D 45/0005* (2013.01); *B64F 5/60* (2017.01); *G05D 1/0088* (2013.01); *G05D 1/0607* (2013.01); *B64D 2045/001* (2013.01)

(58) Field of Classification Search
CPC .................................................. B64D 45/0005
See application file for complete search history.

(56) References Cited

U.S. PATENT DOCUMENTS

| | | | |
|---|---|---|---|
| 7,944,369 B2 | 5/2011 | Appleyard et al. | |
| 8,181,914 B2 * | 5/2012 | Kopp | F16F 1/14 244/229 |
| 9,340,278 B2 * | 5/2016 | Hagerott | B64C 13/30 |
| 9,506,751 B2 | 11/2016 | Zhao | |
| 9,555,896 B2 * | 1/2017 | Kneuper | G08G 5/0052 |
| 9,802,693 B2 | 10/2017 | Yeeles | |
| 10,318,057 B2 * | 6/2019 | Kneuper | G06F 3/04883 |
| 10,486,792 B2 * | 11/2019 | Hagerott | B64C 5/10 |
| 10,988,238 B2 * | 4/2021 | Schlipf | B64C 9/02 |
| 2020/0294401 A1 * | 9/2020 | Kerecsen | G05D 1/0287 |

FOREIGN PATENT DOCUMENTS

CN 102305618 A 1/2012

\* cited by examiner

*Primary Examiner* — Michael A Berns
(74) *Attorney, Agent, or Firm* — Erise IP, P.A.

(57) ABSTRACT

An automated flight control functional testing system includes a first sensor on a pilot input device for sensing position of the pilot input device, and a distributed network of sensors on a plurality of control surfaces of an aircraft for sensing positions of the control surfaces. A controller determines an expected position of each control surface based on data signals received from the first sensor, and the controller determines an actual position of each control surface based on data signals received from the distributed network of sensors. An automated flight control functional testing method includes transmitting angle information to a controller from a first angle sensor on a pilot input device and a second angle sensor on a control surface of an aircraft, and comparing an expected angle of a control surface based on the first sensor with an actual angle of the control surface based on the second sensor.

20 Claims, 3 Drawing Sheets

AUTOMATED FLIGHT CONTROL FUNCTIONAL TESTING

CROSS-REFERENCE TO RELATED APPLICATIONS

This application claims the benefit of U.S. Provisional Application No. 62/729,007 entitled "Automated Flight Control Functional Testing" and filed on Sep. 10, 2018, which is herein incorporated by reference in its entirety.

BACKGROUND

1. Field

Embodiments of this disclosure relate generally to the field of manufacturing testing and quality inspections, and more specifically to wireless sensor technology applied to automated testing of aircraft flight control function.

2. Description of the Related Art

Many measurement systems use sensors for testing or calibrating devices. For example, U.S. Pat. No. 9,506,751 to Zhao discloses an inclinometer that provides data of a walking beam in a rod pumping system in which inclination measurement data are wirelessly transmitted. U.S. Pat. No. 9,802,693 to Yeeles discloses a control surface calibration system having a set of transducers and an imaging system for measuring an amount of rotation of a control surface. Calibration of the transducers in Yeeles is performed by comparing the angle information between the transducers and the imaging system. U.S. Pat. No. 7,944,369 to Appleyard et al. discloses a security monitoring system having a tilt sensor with wireless communication where the system compares tilt angle measurements from the tilt sensor with a tilt alarm threshold to determine if an alarm should be sounded. Chinese Patent CN102305618 discloses a wireless inclinometer having an inclinometry tube equipped to wirelessly transmit data for engineering safety monitoring applications.

SUMMARY

In an embodiment, an automated flight control functional testing system includes a first sensor disposed on a pilot input device for sensing a position of the pilot input device. A distributed network of sensors is disposed on a plurality of control surfaces of an aircraft for sensing positions of the plurality of control surfaces. A controller determines an expected position of each control surface based on data signals received from the first sensor, and the controller determines an actual position of each control surface based on data signals received from the distributed network of sensors. A user interface is communicatively coupled with the controller for displaying differences between the expected position and the actual position of each control surface.

In another embodiment, an automated flight control functional testing method includes positioning a first angle sensor on a pilot input device, positioning a second angle sensor on a control surface of an aircraft, transmitting angle information from the first angle sensor and the second angle sensor to a controller, and comparing, via the controller, an expected angle of a control surface based on the first sensor with an actual angle of the control surface based on the second sensor to determine whether the expected angle matches the actual angle.

BRIEF DESCRIPTION OF THE SEVERAL VIEWS OF THE DRAWINGS

Illustrative embodiments of the present disclosure are described in detail below with reference to the attached drawing figures, which are incorporated by reference herein and wherein.

DETAILED DESCRIPTION

Many manufacturing operations include functional testing, especially for complex, high-value, low-volume products. For example, during aircraft manufacturing, flight control surfaces of each aircraft are functionally tested for proper responses to control inputs. Existing methods for performing functional tests of aircraft flight control surfaces include having one operator manually provide inputs to the flight control surfaces via a pilot input device (e.g., a control wheel, center stick, or sidestick) while additional operators measure position changes of the flight control surfaces. Communication between the operators may be accomplished via two-way radio and data may be recorded by hand. Embodiments of the present disclosure provide a monitoring system that uses a plurality of sensors to simultaneously measure positions of a corresponding plurality of control surfaces during functional testing, and wirelessly communicates data from the sensors for processing and analysis in real-time. The disclosed method reduces testing time, requires fewer personnel, and has increased accuracy and higher reliability compared to conventional methods.

Figure 1:
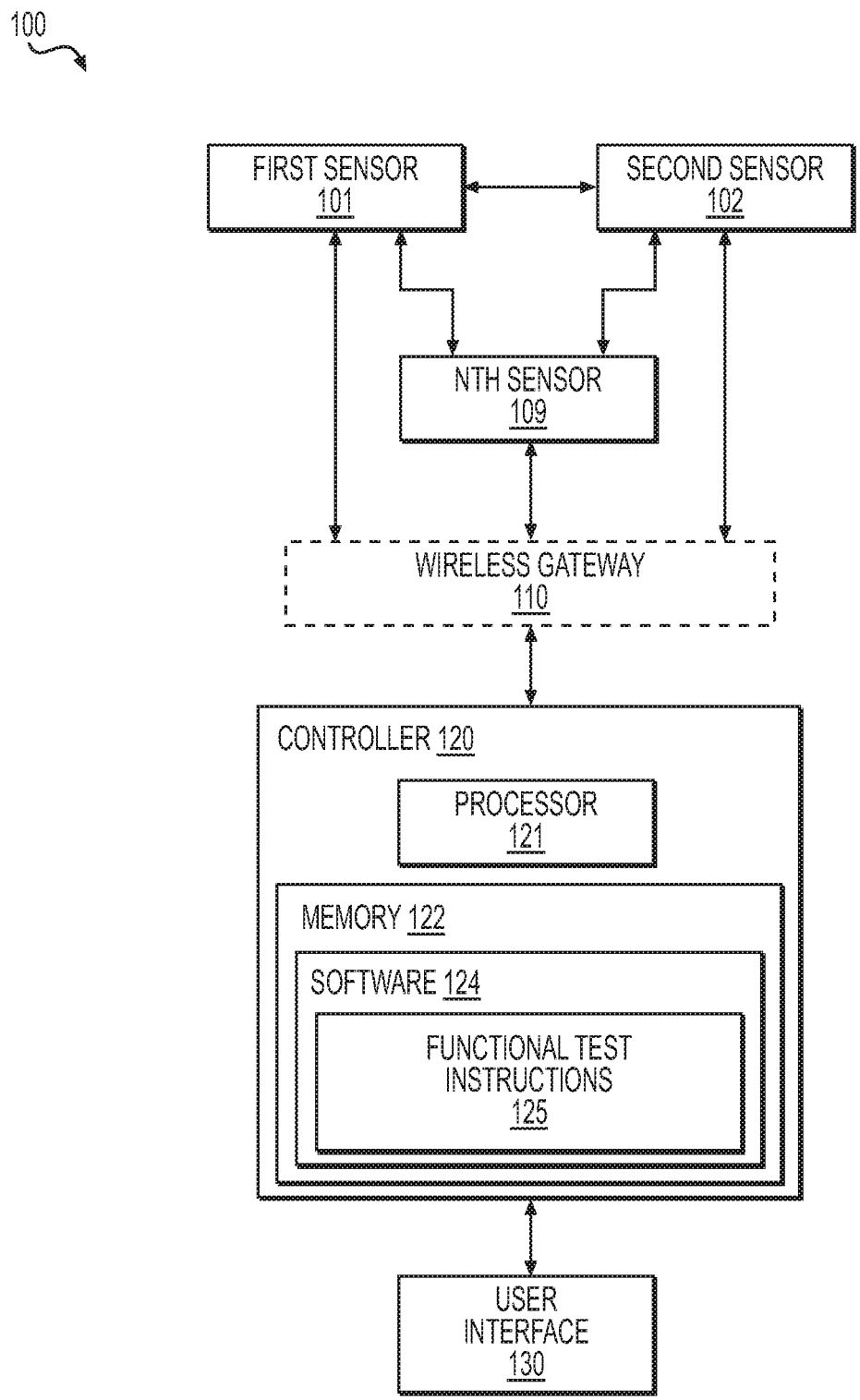
FIG. 1 is a block diagram of an automated flight control functional testing system, in an embodiment.

FIG. 1 is a block diagram of an exemplary automated flight control functional testing system 100. System 100 includes a plurality of sensors that are networked to a controller 120. For example, system 100 may include a first sensor 101, a second sensor 102, and so on up to an Nth sensor 109 (with N being a non-negative integer greater than two). In certain embodiments, first sensor 101 is positioned on a pilot input device, whereas second sensor 102 and so on up to Nth sensor 109 are positioned on a plurality of control surfaces of an aircraft. In some embodiments, the plurality of sensors includes more than thirty sensors. An exemplary sensor of sensors 101-109 is an angle sensor, which is further described below in connection with FIG. 2.

Each of the plurality of sensors 101-109 is communicatively coupled to controller 120 via a wireless communication medium. The plurality of sensors 101-109 may be communicatively coupled among themselves to form a distributed network of sensors (e.g., a "networked array" or a "network of things"). The distributed network of sensors is adapted to form a robust networked array with such traits as self-healing (e.g., if one of sensors 101-109 disconnects from the network, the remaining sensors automatically reestablish the networked array). In certain embodiments, the distributed network of sensors includes sensors 102-109 while first sensor 101 is independently coupled to controller 120.

An optional wireless gateway 110 is communicatively coupled with first sensor 101, second sensor 102, and so on up to Nth sensor 109. In certain embodiments, wireless gateway 110 is a router or integrated access device (IAD) that contains a plurality of input/output interfaces in order to wirelessly interface with a plurality of sensors 101-109 and a controller 120, described below. In some embodiments, wireless gateway 110 includes a web service application programing interface (API) client for handling Internet communication. Alternatively, wireless gateway 110 provides wireless connectivity for a closed (e.g., private) network. Wireless gateway 110 is adapted to identify which sensor (e.g., first sensor 101, second sensor 102, etc.) is wirelessly uploading data.

Controller 120 includes a memory 122 for storing software 124 having machine readable instructions executed by a processor 121. Controller 120 is for example one or more of a server, a computer, a microcontroller, a programmable logic controller (PLC), or a programmable automation controller. Memory 122 in some embodiments is a memory system that includes both transitory memory such as RAM and non-transitory memory such as, ROM, EEPROM, Flash-EEPROM, magnetic media including disk drives, and optical media. Memory 122 stores software 124 as machine readable instructions executable by processor 121 to process data received from sensors. For example, software 124 may include functional test instructions 125, including but not limited to algorithms, lookup tables, and computational models. Instructions 125 provide instructions for processing data signals received from the plurality of sensors 101-109, among other things.

A user interface 130 is communicatively coupled with controller 120 to enable a user to provide input and receive information from controller 120. User interface 130 may include a display communicatively coupled with an input device such as a mouse, keyboard, microphone, or touchscreen. The display may provide results of the functional test as testing proceeds. The results may include a real-time angle (e.g., in degrees), and an indication as to whether an actual angle of a control surface matches an expected angle, as further described below in connection with FIG. 3.

In certain embodiments, user interface 130 provides notifications to alert the operator about certain aspects of a functional test. For example, user interface 130 may include an alerting mechanism to produce an alert such as a display device, a speaker system, a headphone worn by the operator, light sources, or other similar alerting mechanisms, which may be independent from, or incorporated within, interface 130. In certain embodiments, user interface 130 is adapted to display a real-time view of which sensors 101-109 are in operation and their respective locations (e.g., by displaying one or more schematic diagrams of an aircraft with sensor locations illustrated).

User interface 130 is also adapted to receive inputs from a user. In certain embodiments, a user may enter an input position for the pilot input device or for one or more of the plurality of control surfaces. The one or more input positions may be used by controller 120 for determining the expected position of the pilot input device or for the actual positions of one or more of the plurality of control surfaces, rather than using data signals received from sensors 101-109. Alternatively, controller 120 uses the one or more input positions in place of the expected position or the one or more actual positions for determining differences between the expected position and the actual position. In some embodiments, a user may enter an input angle for the pilot input device or a control surface via user interface 130. When determining whether the expected angle based on first sensor 101 matches the actual angle based on one of the distributed network of sensors 102-109 located on a control surface, the input angle may be substituted for either the expected angle or the actual angle. In this manner, controller 120 uses the input angle provided by the user for comparison between the expected angle and the actual angle for determining whether they match. Providing an input position or an input angle via user interface 130 may be useful while installing sensors, for example, since the functional tests may be performed without a complete network of operational sensors.

For example, a user may be rigging one of sensors 102-109 independently of the first sensor 101 and want data from sensors 102-109. The user may provide an input position for the pilot input device via user interface 130 and instruct controller 120 to perform data collection from sensors 102-109 and display that information on user interface 130. In another example, in certain situations the user may perform a sub test that does not require input from first sensor 101 but does require external movement from a lever that controls the elevators. Again, the user may provide an input position for the pilot input device via user interface 130. If the lever does not include one of sensors 102-109, the lever is not directly monitorable, but it may be indirectly monitorable via sensors located on the elevators. Therefore, the user may instruct controller 120 via user interface 130 to request data from sensors 102-109 after the lever has been moved, thereby indirectly determining the effect of moving the lever.

Figure 2:
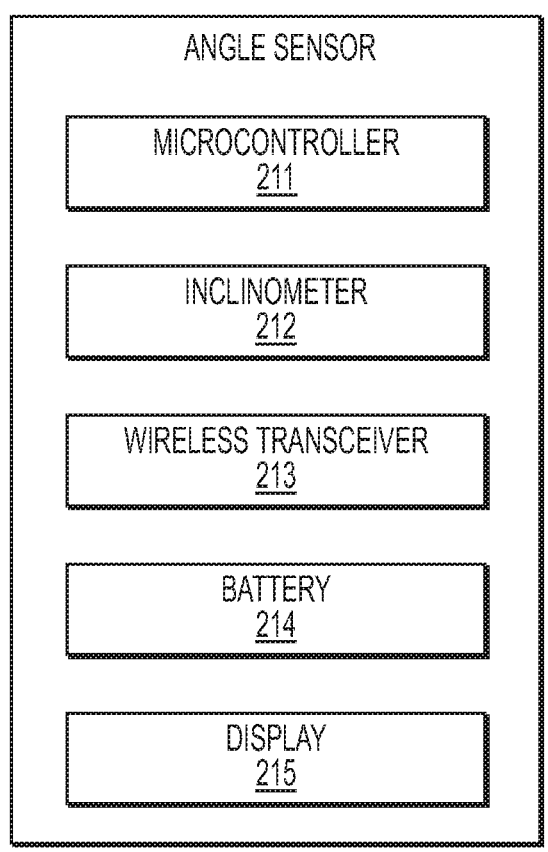
FIG. 2 is a block diagram of an angle sensor used in the automated flight control functional testing system of FIG. 1, in an embodiment.

FIG. 2 is a block diagram of an angle sensor 201 used in the automated flight control functional testing system 100. Angle sensor 201 is an example of first sensor 101, FIG. 1 used for measuring an angle of an aircraft control surface. Angle sensor 201 includes a microcontroller 211, an inclinometer 212, a wireless transceiver 213, a battery 214, and optionally a display 215. However, other types of angle sensors, gyroscopes, accelerometers, or other measuring devices may be used to determine control surface angles without departing from the scope hereof.

Microcontroller 211 may be any microcontroller, programmable logic controller (PLC), programmable automation controller, or the like having a memory for storing software, and a processor for executing instructions of the software. In certain embodiments, microcontroller 211 is an Arduino circuit board.

Inclinometer 212 is for example an instrument used to measure angles of tilt or slope (e.g., with respect to gravity). Inclinometer 212 may include a gyroscope. Alternatively, inclinometer 212 includes a liquid filled angle sensor. In certain embodiments, inclinometer 212 is a Pro 3600 digital protractor from Level Developments, Ltd. (Chicago, Ill.). Alternatively, inclinometer 212 is a microelectromechanical systems (MEMS) gyroscope that senses gravity for determining a degree of levelness of the MEMS device. In some embodiments, inclinometer 212 is a MPU-6050 six axis gyroscope-accelerometer MEMS chip from InvenSense (San Jose, Calif.). In certain embodiments, inclinometer 212 is adapted for measuring angles in three axes such that controller 120 determines roll, pitch, and yaw input commands based on the measured angles of the pilot input device.

Wireless transceiver 213 is for example a WiFi transmitter/receiver for providing bidirectional radio wireless communication. In certain embodiments, inclinometer 212 is communicatively coupled with wireless transceiver 213 via a RS-232 serial port, and wireless transceiver 213 wirelessly transmits data from inclinometer 212 to controller 120. In certain embodiments, wireless transceiver 213 includes a WiFi antenna mounted to a circuit board.

Battery 214 is for example a rechargeable battery such as a rechargeable lithium-ion battery. In certain embodiments, battery 214 is electrically coupled with a wireless charging coil to enable wirelessly recharging of battery 214.

Optional display 215 is for example a liquid-crystal display (LCD), an organic light-emitting diode (OLED) display, or other digital display for displaying information of the angle sensor such as angle data. In certain embodiments, display 215 is incorporated into inclinometer 212.

In operation, angle sensor 201 communicates data to controller 120, which logs the data and records a time stamp of when the data were logged. The angle sensor may provide data automatically at regular intervals, for example, as a digital signal at a processor rate (e.g., every 25 ms). In some embodiments, controller 120 may send a request for information from angle sensor 201 at any instance or according to any schedule. Controller 120 is adapted to collect data from the plurality of sensors 101-109 in parallel, which reduces the duration of functional testing. Data from the plurality of sensors 101-109 is analyzed by controller 120 (e.g., according to functional test instructions 125) and results are displayed on interface 130. The results may include numeric and graphic displays of information such as a unique serial identification number of each angle sensor, an angle from a nominal position (e.g., in degrees) corresponding to one or more control surfaces, and whether an expected angle matches or differs from an actual angle, as further described below in connection with FIG. 3.

Figure 3:
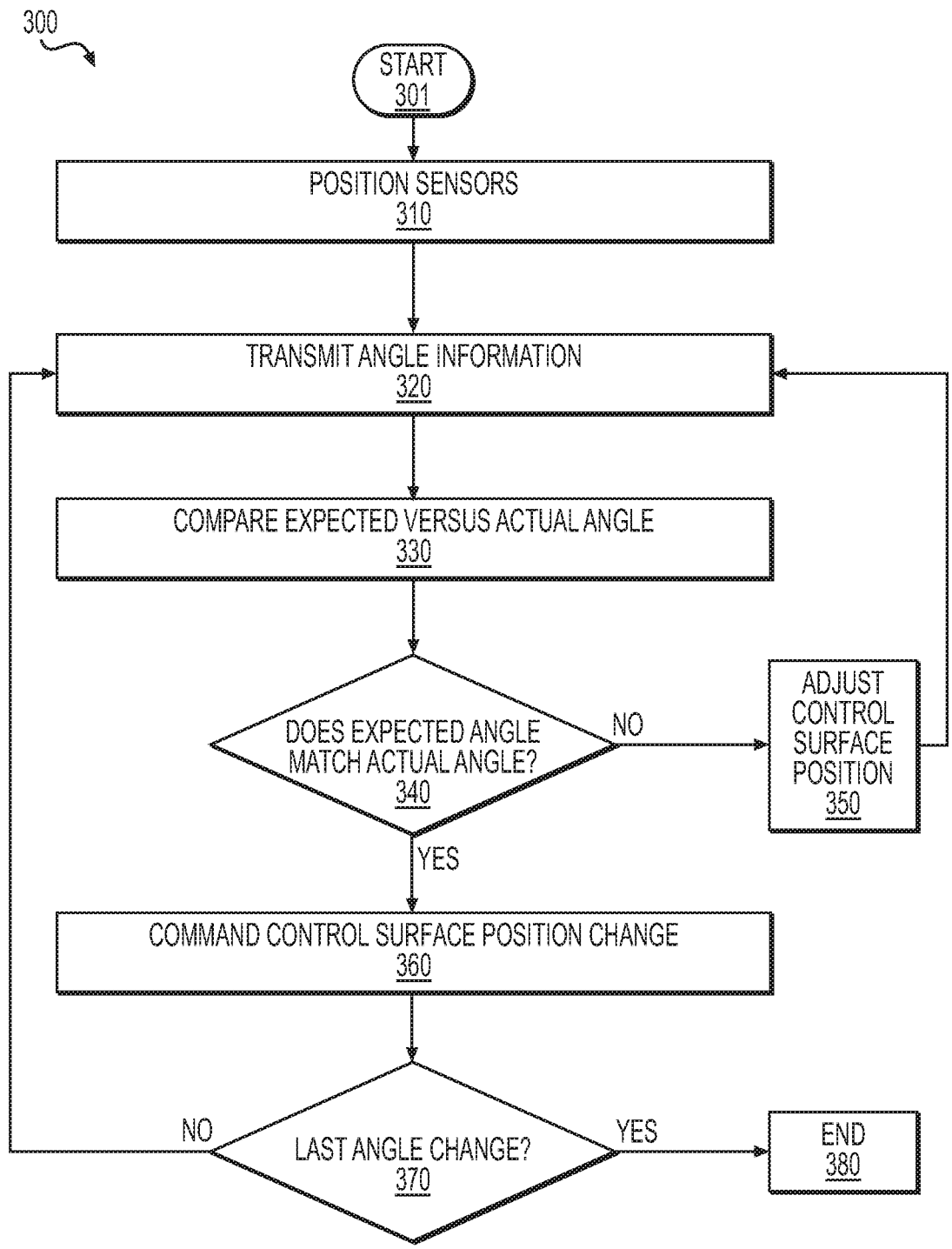
FIG. 3 is a block diagram of an automated flight control functional testing method, in an embodiment.

FIG. 3 is a block diagram of an exemplary automated flight control functional testing method 300. Method 300 may be performed using system 100, FIG. 1, for example.

In a step 301, the method is started. In an example of step 301, method 300 is selected for initiation by an operator via user interface 130, FIG. 1.

In a step 310, sensors are positioned. In an example of step 310, sensors 101-109, FIG. 1 are mounted on various control surfaces of an aircraft and on a pilot input device (e.g., a control wheel, center stick, or sidestick). Example control surfaces include but are not limited to ailerons, flaps, speed brakes, slats, trim tabs, elevators, elevator trim tabs, and the rudder. An exemplary sensor is angle sensor 201, FIG. 2. In certain embodiments, at least one angle sensor is mounted on each of an aircraft's control surfaces. For example, angle sensor 201 may be installed on top of the elevator in an orientation that is normal to the elevator hinge line. Mounting of angle sensor 201 on a control surface may include mounting inclinometer 212 to a metal (e.g., aluminum) plate that forms tabs extending beyond a base of inclinometer 212 and taping the tabs to a control surface using tape (e.g., aluminum foil tape). Mounting of angle sensor 201 on a pilot input device may involve a specially machined adapter for securing the angle sensor 201 (e.g., using bolts) to the pilot input device.

In a step 320, sensor information is transmitted to the controller. In an example of step 320, angle sensor 201 collects data from inclinometer 212 via microcontroller 211 and transmits the data via wireless transceiver 213 to controller 120 via wireless gateway 110. The data is for example a real-time indication of an angle (e.g., degrees from nominal) of the control surface to which angle sensor 201 is mounted. Data from a plurality of angle sensors may be provided simultaneously from various control surfaces as well as the pilot input device.

In a step 330, an expected angle is compared to an actual angle. In an example of step 330, controller 120 determines an expected angle based on angle sensor data (e.g., pitch, roll, and yaw) from the pilot input device and compares it to the actual flight control surface angle measured from one or more control-surface-mounted angle sensors.

Step 340 is a decision. If in step 340 controller 120 determines that the expected angle differs from the actual angle, method 300 proceeds with step 350. Otherwise, if controller 120 determines that the expected angle matches the actual angle, method 300 proceeds with step 360. Controller 120 may use a predetermined difference or a predetermined range for determining matched angles versus differing angles to meet certain accuracy objectives. For example, two angles that differ by a small margin may be considered the same (e.g., the two angles may differ only within the limits of signal noise from the sensors), whereas two angles that differ by at least the predetermined difference are determined to be different. In certain embodiments, controller 120 provides an alert via user interface 130 to notify the operator as to the status of the determination. For example, a green light may be illuminated to indicate that the actual angle matches the expected angle, while a red light may be illuminated to indicate that the actual and expected angles differ.

In a step 350, a position of a control surface is adjusted. In an example of step 350, an elevator position is manually adjusted to correct the actual angle of the elevator such that it matches the expected angle. Once the control surface has been adjusted, method 300 returns to step 320 and repeats steps 320-340. In this manner, a control surface may be repeatedly adjusted and measured to iteratively reduce the difference between the expected angle and the actual angle.

In a step 360, a position of a control surface is commanded to change. In an example of step 360, an operator moves the pilot input device which commands one or more control surfaces to move accordingly. The aircraft control system may include a mechanical linkage between the pilot input device and the control surface, or a fly-by-wire connection, or some combination of these. For the mechanical linkage, the command from the pilot input device is transmitted to the control surface mechanically. For the fly-by-wire system, the command may be electronically transmitted to an actuator of the control surface. In certain embodiments, controller 120 and user interface 130 are part of a laptop computer and the operator has the laptop computer in the cockpit. In this manner, the operator may manipulate the pilot input device and simultaneously visualize the angle sensor data from the control surfaces to test additional control surface positions.

Step 370 is a decision. If in step 370 the last angle change has been tested, method 300 proceeds to step 380 and ends. Otherwise, if additional angle changes will be tested, method 300 returns to step 320 and repeats steps 320 to 360.

Method 300 may be used to generate a report of a flight control functional test. For example, controller 120 of FIG. 1 may generate a report based on functional test instructions 125 that details results of actual flight control surface positions and by how much the actual positions differ from expected flight control surface positions based on a measured position of the pilot input device.

Advantages of the automated flight control functional testing method 300 include a substantial time savings. For example, an exemplary functional test for aircraft flight control surfaces was reduced from twenty-one hours to forty minutes. The method also reduces the number of personnel to carry out the functional test. For example, three personnel typically perform existing methods, whereas method 300 may be performed by a single operator. Another costs savings is provided by a reduction in quality inspections. For example, existing methods require a quality inspection of all of the data from every aircraft. In contrast, once method 300 has been verified (e.g., functional test instructions 125 are inspected), the method may be reused on additional aircraft without an additional quality inspection. Furthermore, because method 300 is automated, there are fewer opportunities for errors and less rework is needed. Method 300 may be applied to newly manufactured aircraft and also to existing aircraft (e.g., during maintenance at service centers).

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and sub-combinations are of utility and may be employed without reference to other features and sub-combinations and are contemplated within the scope of the claims. Not all steps listed in the various figures need be carried out in the specific order described.

What is claimed is:

1. An automated flight control functional testing system, comprising:
    a first sensor disposed on a pilot input device for sensing an angle of the pilot input device,
        wherein the pilot input device comprises one of a control wheel, a center stick, or a sidestick;
    a distributed network of sensors temporarily disposed externally on a plurality of control surfaces of an aircraft for sensing angles of the plurality of control surfaces while not in flight;
    a controller for determining an expected angle of each control surface based on data signals received from the first sensor and for determining an actual angle of each control surface based on data signals received from the distributed network of sensors; and
    a user interface communicatively coupled with the controller for displaying differences between the expected angle and the actual angle of each control surface.

2. The automated flight control functional testing system of claim 1, wherein the user interface receives a first input position for the pilot input device or a second input position for one or more of the plurality of control surfaces for determining an expected position or an actual position of one or more of the plurality of control surfaces, respectively.

3. The automated flight control functional testing system of claim 1, further comprising a wireless gateway for providing bidirectional wireless communication with the controller such that the data signals may be collected from the first sensor and the distributed network of sensors in parallel.

4. The automated flight control functional testing system of claim 1, wherein the controller processes the data signals received from the first sensor to determine movements of the pilot input device and to determine expected movements of the plurality of control surfaces based on the movements of the pilot input device.

5. The automated flight control functional testing system of claim 1, wherein the distributed network of sensors are communicatively coupled among themselves to form a networked array of sensors.

6. The automated flight control functional testing system of claim 1, wherein the first sensor and the distributed network of sensors each comprise an angle sensor adapted to determine an angle deflection from a nominal angle.

7. The automated flight control functional testing system of claim 6, wherein the angle sensor comprises:
    an inclinometer for measuring the angles with respect to gravity;
    a microcontroller adapted to receive signals from the inclinometer and process the signals to provide angle data based on the angles;
    a battery for providing electrical power; and
    a wireless transmitter for transmitting the angle data to the controller.

8. The automated flight control functional testing system of claim 7, the angle sensor communicates the angle data to the controller for logging the angle data and recording a time stamp of when the angle data were logged.

9. The automated flight control functional testing system of claim 1, wherein the user interface displays the actual angle for each control surface and an indication as to whether the actual angle differs from the expected angle in real-time.

10. The automated flight control functional testing system of claim 1, wherein the user interface displays a real-time view of sensor locations for the distributed network of sensors and an indication of which sensors in the distributed network of sensors are in operation.

11. The automated flight control functional testing system of claim 1, wherein the user interface provides an alerting mechanism for alerting a user when the actual angle differs from the expected angle by at least a predetermined difference.

12. An automated flight control functional testing method, comprising:
    positioning a first angle sensor on a pilot input device, wherein the pilot input device comprises one of a control wheel, a center stick, or a sidestick;
    temporarily mounting a second angle sensor on a control surface of an aircraft while not in flight;
    transmitting angle information from the first angle sensor and the second angle sensor to a controller; and
    comparing, via the controller, an expected angle of the control surface based on the first sensor with an actual angle of the control surface based on the second sensor for determining whether the expected angle matches the actual angle.

13. The automated flight control functional testing method of claim 12, further comprising:
    receiving a first input position for the pilot input device or a second input position for the control surface via a user interface; and
    substituting the first input position for the expected angle or the second input position for the actual angle to determine whether the expected angle matches the actual angle.

14. The automated flight control functional testing method of claim 13, further comprising:
    commanding a control surface position change; and
    repeating the steps of transmitting the angle information and comparing the expected angle with the actual angle for determining whether the expected angle matches the actual angle for an additional control surface position.

15. The automated flight control functional testing method of claim 13, further comprising displaying the angle information on a user interface.

16. The automated flight control functional testing method of claim 15, wherein displaying the angle information on the user interface includes displaying the angle information graphically and numerically as an angle deflection from a nominal angle for one or more control surfaces.

17. The automated flight control functional testing method of claim 13, further comprising alerting a user when the actual angle differs from the expected angle by at least a predetermined difference.

18. The automated flight control functional testing method of claim 13, wherein the controller generates a report detailing the results of a flight control functional test that may be used for testing verification.

19. The automated flight control functional testing method of claim 12, further comprising:
when the expected angle differs from the actual angle, repositioning the control surface; and
repeating the steps of transmitting the angle information, comparing the expected angle with the actual angle, and repositioning the control surface until the expected angle matches the actual angle.

20. A testing system for an aircraft flight-control system, the testing system comprising:
a first angle sensor configured to be locatable on a pilot-input device of an aircraft,
wherein the pilot-input device comprises one of a control wheel, a center stick, or a sidestick;
a second angle sensor temporarily mounted for a testing time on a control surface of the aircraft while not in flight;
a wireless transceiver configured to transmit angle information from the first angle sensor and the second angle sensor to a control system; and
a process operating on the control system, the process configured to compare a first data set regarding a first angle obtained from the first angle sensor against a second data set regarding a second angle obtained from the second angle sensor to determine whether the aircraft flight-control system is functioning properly.

\* \* \* \* \*